US010203041B2

(12) United States Patent
Smith, Jr.

(10) Patent No.: US 10,203,041 B2
(45) Date of Patent: Feb. 12, 2019

(54) GROOVED VALVE STEMS FOR WHEEL-SIDE INSTALLATION

(71) Applicant: Raymond H. Smith, Jr., Macon, GA (US)

(72) Inventor: Raymond H. Smith, Jr., Macon, GA (US)

( * ) Notice: Subject to any disclaimer, the term of this patent is extended or adjusted under 35 U.S.C. 154(b) by 0 days.

(21) Appl. No.: 15/273,489

(22) Filed: Sep. 22, 2016

(65) Prior Publication Data

US 2018/0080572 A1    Mar. 22, 2018

(51) Int. Cl.
| | |
|---|---|
| *F16K 15/20* | (2006.01) |
| *B60C 25/18* | (2006.01) |
| *B60C 29/00* | (2006.01) |
| *B60C 29/02* | (2006.01) |

(52) U.S. Cl.
CPC .............. *F16K 15/20* (2013.01); *B60C 25/18* (2013.01); *B60C 29/005* (2013.01); *B60C 29/02* (2013.01); *Y10T 137/3584* (2015.04)

(58) Field of Classification Search
CPC .. F16K 15/20; Y10T 137/3584; Y10T 137/36; Y10T 137/3615; Y10T 137/3631; Y10T 137/3646; Y10T 137/3662; Y10T 137/3677; Y10T 137/3693; Y10T 137/3709; Y10T 137/3724; Y10T 137/374; Y10T 137/3755; Y10T 137/3771; Y10T 137/3706; Y10T 137/6086; Y10T 137/6109; Y10T 137/0441; Y10T 137/0447; Y10T 137/0486; Y10T 137/0491; B60C 23/04; B60C 23/0494; B60C 25/18; B60C 29/005; B60C 29/02

USPC ........ 137/223–234.5, 315.33, 315.41, 15.08, 137/15.09, 15.17, 15.18; 152/415, 427, 152/429, DIG. 11; 215/355, 356

See application file for complete search history.

(56) References Cited

U.S. PATENT DOCUMENTS

| | | | | |
|---|---|---|---|---|
| 1,289,575 | A | | 12/1918 | Tisne |
| 2,225,472 | A | * | 12/1940 | Franklin ................ H02G 3/083 152/427 |
| 2,830,641 | A | | 4/1958 | Wolfe |

(Continued)

FOREIGN PATENT DOCUMENTS

| | | |
|---|---|---|
| DE | 2008407 A1 | 9/1971 |
| EP | 0006500 B1 | 5/1981 |

OTHER PUBLICATIONS

International Search Report and Written Opinion, PCT Application No. PCT/US2017/052843, dated Dec. 8, 2017.

*Primary Examiner* — Craig J Price
(74) *Attorney, Agent, or Firm* — Kilpatrick Townsend & Stockton LLP

(57) ABSTRACT

Described are valve stems for wheels or other pressure vessels that may be installed from the exterior of a wheel or pressure vessel without access to the interior, pressure retaining areas. The valve stem may include a body with a barrel and taper. A neck may be between the body and a base that includes a flange, a flange landing, and an air aperture. An air channel runs vertically through the valve stem to allow air to pass from one side of the valve stem to another with a valve core or other flow control device. The base of the valve stem may include a groove that allows the valve stem to be installed into a hole by twisting such that the groove may ride along the rim of the hole and guide the valve stem into a fully seated and sealed position.

11 Claims, 13 Drawing Sheets

(56) References Cited

U.S. PATENT DOCUMENTS

| | | | |
|---|---|---|---|
| 2,835,304 A | 5/1958 | Lee | |
| 2,838,088 A * | 6/1958 | McIntire | B60C 29/02 |
| | | | 152/427 |
| 2,845,979 A * | 8/1958 | Williams | B60C 29/02 |
| | | | 152/427 |
| 2,862,515 A | 12/1958 | Briechle | |
| 2,862,539 A | 12/1958 | Williams | |
| 2,995,168 A | 8/1961 | McCord | |
| 3,087,529 A * | 4/1963 | Morton | B60C 29/02 |
| | | | 152/427 |
| 3,177,724 A * | 4/1965 | Trinca | B60C 23/0496 |
| | | | 116/34 R |
| 3,311,153 A | 3/1967 | Wolfe | |
| 3,830,277 A | 8/1974 | Lejeune | |
| 3,863,697 A * | 2/1975 | Brown | B60C 29/00 |
| | | | 137/223 |
| 5,639,810 A * | 6/1997 | Smith, III | A61L 29/041 |
| | | | 524/269 |
| 6,574,843 B1 * | 6/2003 | Meadows | B25B 27/24 |
| | | | 29/221.5 |
| 6,722,409 B1 | 4/2004 | Martin | |
| 7,810,390 B2 * | 10/2010 | Hettle | B60C 23/0408 |
| | | | 73/146.8 |
| 8,661,886 B2 * | 3/2014 | Choe | B60C 23/0494 |
| | | | 73/146.8 |
| 9,272,588 B1 * | 3/2016 | Groom | B60C 29/02 |
| 2008/0202659 A1 * | 8/2008 | Hettle | B60C 23/0408 |
| | | | 152/415 |
| 2015/0059948 A1 | 3/2015 | Lelievre et al. | |

* cited by examiner

GROOVED VALVE STEMS FOR WHEEL-SIDE INSTALLATION

FIELD OF THE INVENTION

The field of the invention relates to pneumatic tires or the like, and more particularly to valve stems and air valves for tubeless pneumatic tires.

BACKGROUND

Valve stems, particularly those used in tubeless, pneumatic tires, are used to allow gases, typically air, to be added or removed from a tire or pressure vessel. The valve stem is generally constructed with an air passage extending from the inner portion of a wheel or pressure vessel to the outer portion. A valve core within the air passage controls the flow of air through the valve stem and helps maintain the pressure within a tire or pressure vessel.

Valve stems, particularly those used on wheels, may become damaged or may degrade over time such that they lose pressure due to the failure of a valve core or the hardening and cracking of the rubber that provides a seal with the wheel or pressure vessel. As a result, periodic replacement of valve stems is necessary. Existing valve stems are designed to be installed into a wheel or pressure vessel by pulling the valve stem through a hole from the high pressure side to the low pressure side. In the case of a wheel, the valve stem is pulled from the tire side to the exposed portion of a wheel. This type of installation requires the removal of the tire, which may or may not need replacement at the time of a valve stem replacement.

Tire removal generally involves high levels of deformation of the tire to break the tire bead seal from the wheel. For some wheels, particularly two-part steel wheels that are found on many small off-road vehicles, such as golf carts and all-terrain vehicles, breaking the bead of the tire from the wheel will cause separation of the wheel parts. These parts, which may have rusted along their joining seam, may be difficult or impossible to re-align or re-seal and may necessitate wheel replacement. Even in the case of single-piece wheels, the replacement of a valve stem requires removal of the tire, leading to possible damage from breaking the bead seal, and additional labor costs to re-mount and re-balance the tire for the replacement of the valve stem.

In certain cases, it may be desirable to provide a valve stem that can be installed from the exterior or exposed portion of a wheel or pressure vessel. A valve stem that may be installed from the unpressurized portion of a wheel or other pressure vessel may eliminate the need to open a pressure vessel or dismount a tire from a rim. In the particular case of pneumatic tires, eliminating the dismount, re-mount, and re-balancing of a tire may reduce the risk of tire damage or unseating of parts that may be difficult or impossible to re-seat or re-seal. A valve stem that may be installed from the unpressurized side of a wheel or pressure vessel may make valve stem replacement easier and reduce the amount of labor required for a routine repair.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a valve stem may comprise a body comprising a shoulder or bead, an air channel, a neck, and a base. The base may comprise a flange, a flange landing, and an air aperture, wherein the air channel is disposed within the body of the valve stem and is configured to enclose a valve core, and the base of the valve stem comprises at least one helical groove.

In certain embodiments, the at least one helical groove may breach the flange landing.

In some embodiments, the at least one helical groove may terminate below the flange landing.

In certain embodiments, the at least one helical groove may comprise a groove form selected from the group consisting of square, curved, trapezoidal, and triangular.

In some embodiments, the flange landing may comprise a notched annular reinforcement structure. In certain embodiments, the flange landing may comprise an annular reinforcement structure.

In some embodiments, the at least one helical groove may initiate at the air aperture of the base.

In certain embodiments, the at least one helical groove may initiate at a periphery of the base.

In some embodiments, the valve stem may further comprise a barrel and a taper, wherein the taper gradually expands from a radius that is approximately the same as a radius of the barrel to a radius that is larger than the radius of the barrel, and the barrel or taper may comprise at least one flat surface.

In certain embodiments, the at least one flat surface comprises a shape selected from the group consisting of a hexagon, square, pentagon, and star-shaped.

In some embodiments, the base of the valve stem may comprise a conical frustum shape.

In certain embodiments, the at least one helical groove may comprise two helical grooves.

In some embodiments, the base of the valve stem may comprise an impregnated lubricant.

In certain embodiments, the radius of the shoulder or bead of the valve stem may be less than the radius of the flange of the valve stem.

In some embodiments, a depth at an initiation point of the at least one helical groove may be greater than a depth at a termination point of the at least one helical groove. In further embodiments, a depth at an initiation point of the at least one helical groove may be less than a depth at a termination point of the at least one helical groove.

In certain embodiments, the neck of the valve stem may further comprise a surface layer comprising a sealing material selected from the group consisting of an elastomer and a foam.

According to certain embodiments of the present invention, a method for installing a valve stem into a wheel may comprise cleaving an existing valve stem, separating the existing valve stem from the wheel, providing a second valve stem wherein the second valve stem may comprise at least one helical groove in a base of the second valve stem, lubricating the base of the second valve stem, inserting the base of the second valve stem into a hole in the wheel, angling the second valve stem such that the at least one helical groove may catch a rim of the hole, and rotating the second valve stem wherein the at least one helical groove pulls the second valve stem into the hole to seat the second valve stem.

In some embodiments, lubricating the base of the second valve stem may comprise lubricating with a lubricant selected from the group consisting of an aqueous solution, a soap and water solution, an oil-based lubricant, and a liquid rubber lubricant.

In certain embodiments, rotating the second valve stem may comprise engaging a drive tool with at least one flat surface disposed on the second valve stem.

DETAILED DESCRIPTION

Figure 1:
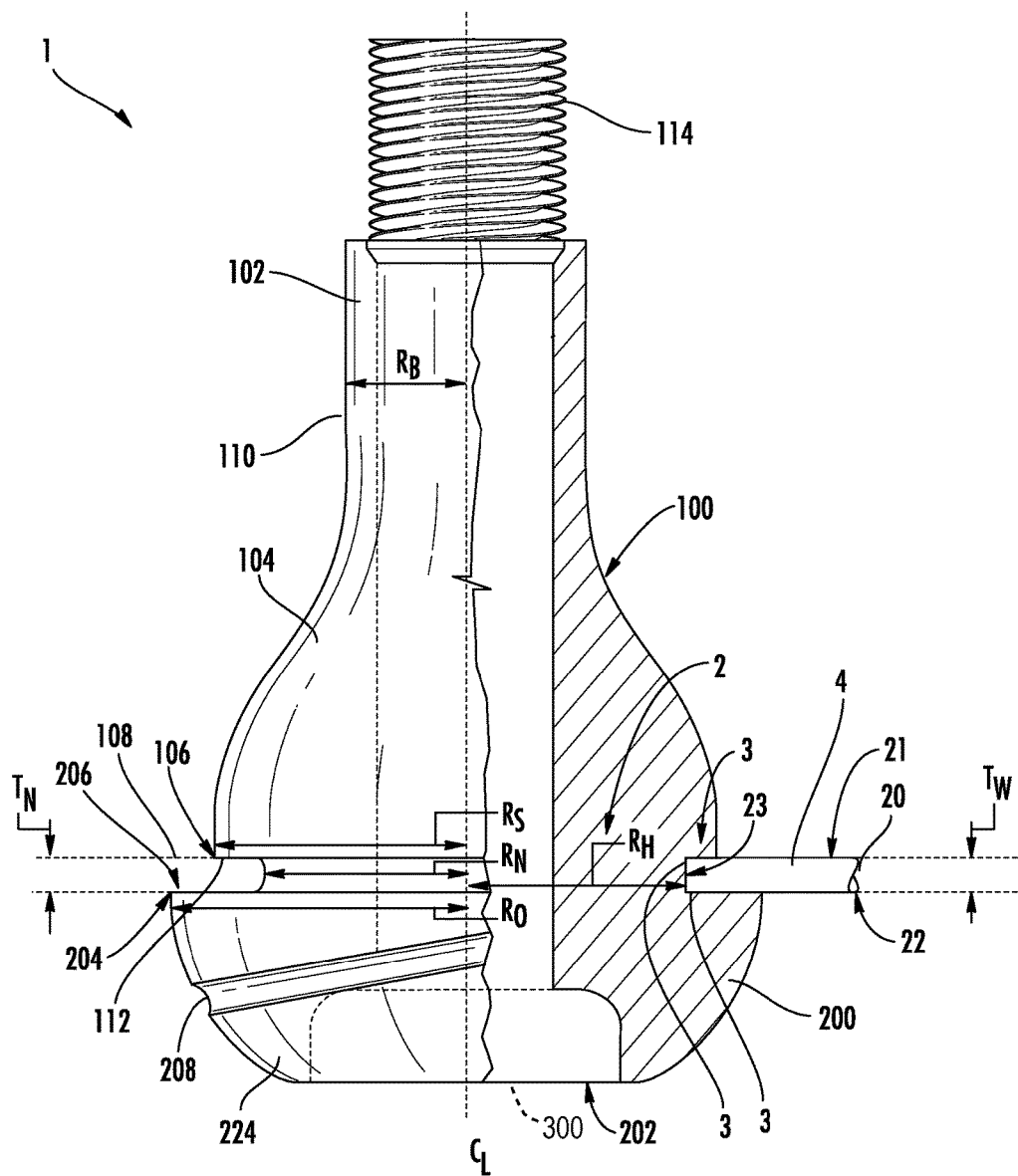
FIG. 1 is a sectional view of a valve stem with a grooved base, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a valve stem with a grooved base for installation into a hole. While the valve stems are discussed for use with wheels and tubeless tires, they are by no means so limited. Rather, embodiments of the valve stem may be used in any structure that must seal a hole and allow for pressurization or depressurization of the structure.

In some embodiments of the present invention, as shown in FIGS. 1A-7, a valve stem 1 may comprise a body 100 coupled to a base 200 through a neck 108. The valve stem 1 comprises an air channel 300, which may contain a valve core 10 or other flow control device, running generally along a centerline $C_L$ of the valve stem 1 through the body 100 and the base 200. The air channel 300 may terminate at the top of the body 100 at an optional threaded portion 114, and at the bottom of the base 200 at an air aperture 202. The threaded portion 114 may be configured to receive a cap 116 to protect the air channel 300 and any internal flow control devices from the ingress of dirt or debris and to provide a secondary sealing mechanism in case of failures of the internal flow control devices.

In some embodiments, the body 100 of the valve stem 1 may be described as generally comprising a barrel 102 and a taper 104. The barrel 102 comprises a barrel radius $R_B$, which is defined as a distance from the centerline $C_L$ to an outer surface of the barrel 102. The barrel 102 typically has a relatively constant barrel radius $R_B$ over the length of the barrel 102.

The body 100 then transitions from the barrel 102 to the taper 104. The taper 104 may have a radius that is approximately the same as the barrel radius $R_B$ at a transition point 110 between the barrel 102 and the taper 104. The taper 104 may then gradually expand from the transition point 110 until it transitions into a shoulder 106 or bead 107, which delineates a change from the taper 104 to the neck 108. The shoulder 106 may have a shoulder radius $R_S$, which is defined as a distance from the centerline $C_L$ to an outer surface of the shoulder 106 at a point that is adjacent an edge 112 that forms an upper boundary of the neck 108. The shoulder radius $R_B$ may be larger than the barrel radius $R_B$. In the embodiments where the taper 104 widens to form a bead 107, the shoulder radius $R_S$ is defined as a distance from the centerline $C_L$ to a point that is located at a maximum thickness of the bead 107.

The neck 108 comprises a neck radius $R_N$, which is defined as a distance from the centerline $C_L$ to an outer surface of the neck 108. The shoulder radius $R_S$ is larger than the neck radius $R_N$ in certain embodiments, but the person of ordinary skill in the relevant art will understand that the shoulder radius $R_S$ may be equal to or smaller than the neck radius $R_N$, depending on the design and needs for the valve stem 1.

Still referring to FIGS. 1-5, the base 200 comprises an outer radius $R_O$, which is defined as a distance from the centerline $C_L$ to an outer surface of the base 200 at a point that is adjacent a flange 204 that forms a lower boundary of the neck 108. The outer radius $R_O$ is larger than the neck radius $R_N$ in certain embodiments, but the person of ordinary skill in the relevant art will understand that the outer radius $R_O$ may be equal to or smaller than the neck radius $R_N$, depending on the design and needs for the valve stem 1. In the embodiments where the outer radius $R_O$ is larger than the neck radius $R_N$, the difference between the radii of the outer radius $R_O$ and neck radius $R_N$ forms a flange landing 206, which may provide one of the seating and sealing areas of the valve stem 1 when installed in a wheel 4 or other pressure retention structure.

Figure 1A:
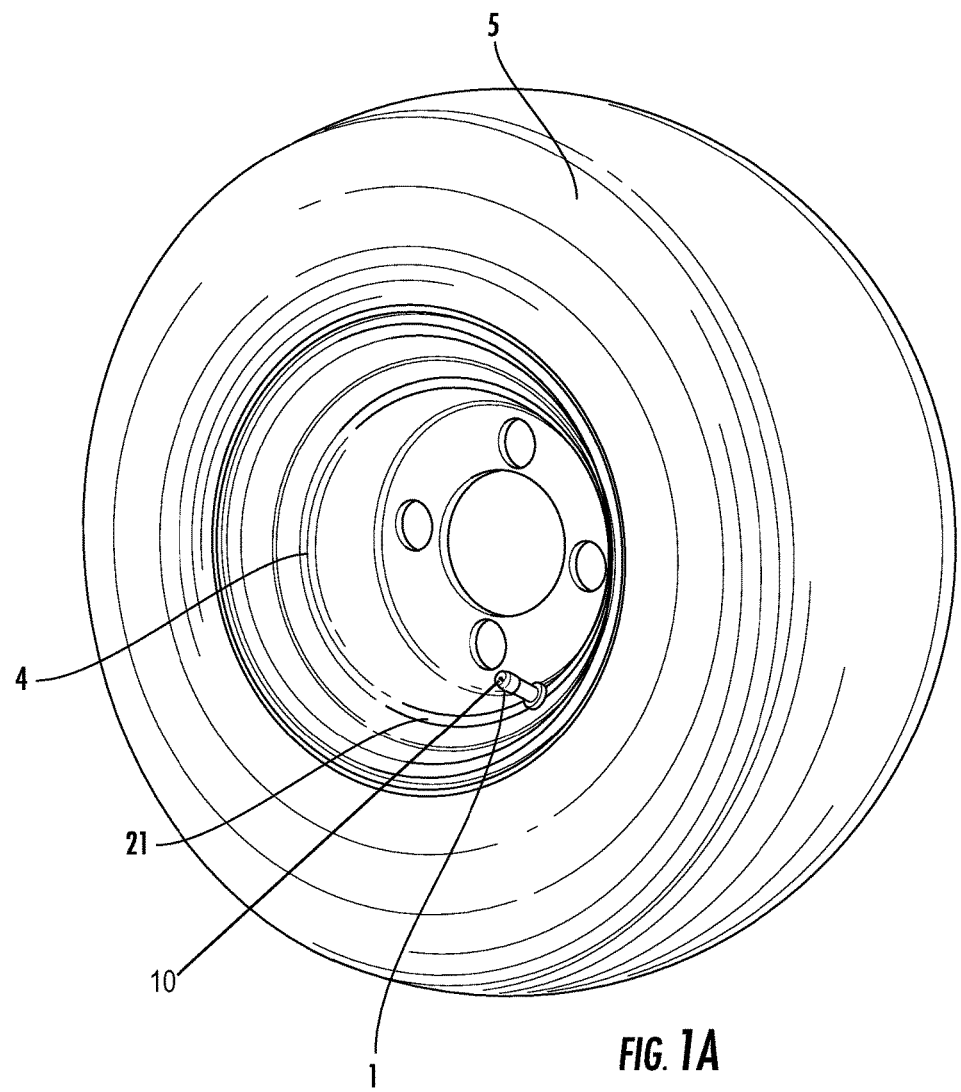
FIG. 1A is a perspective view of a wheel with a mounted tire and a valve stem, according to certain embodiments of the present invention.

When the valve stem 1 is installed in the wheel 4, the valve stem 1 extends through a wheel hole 2 in such a manner that the base 200 is positioned on a tire side 22 of the wheel 4 (the side that is enclosed within a tire 5), the body 100 is positioned on a wheel side 21 of the wheel 4 (the side that is exposed to the outside environment, as shown in FIG. 1A), and the neck 108 is positioned within the wheel hole 2. In other words, as best illustrated in FIG. 1, the shoulder 106 or bead 107 of the body 100 overlaps the wheel or exterior side 21 of a rim of the wheel hole 2, the flange 204 of the base 200 overlaps the tire or interior side 22 of the rim of the wheel hole 2, and the neck 108, which is positioned between the body 100 and the base 200, is positioned within the wheel hole 2. The wheel side 21 and tire side 22 of the wheel hole flange 20 may sometimes be referred to as the inside and outside of the wheel, respectively.

The wheel hole 2 may have a wheel hole radius $R_H$, which is defined as a distance from a center of the wheel hole 2 to any point around a circumference of the wheel hole 2. In some embodiments, the outer radius $R_O$ of the base 200 may be larger than the wheel hole radius $R_H$ so that, when the base 200 is positioned against the wheel hole 2 (either from the inside or the outside of the wheel 4) and the centerline $C_L$ of the valve stem 1 is approximately aligned with the center of the wheel hole 2, the entirety of the base 200 cannot pass through the wheel hole 2. The reason for the relative size difference between the two radii is so that the base 200, when positioned against the tire side 22 of the wheel hole 2, prevents the valve stem 1 from passing through the wheel hole 2 and also acts to seal the wheel hole 2 to retain a gas inside the mounted tire 5/wheel 4 structure when the tire 5 is installed over the wheel 4 and pressurized up to a range of about 34.5 kPa (5 psi) to about 517.1 kPa (75 psi), about 34.5 kPa (5 psi) to about 103.4 kPa (15 psi), about 34.5 kPa (5 psi) to about 48.3 kPa (7 psi), about 34.5 kPa (5 psi) to about 55.2 kPa (8 psi), about 55.2 kPa (8 psi) to about 68.9 kPa (10 psi), about 55.2 kPa (8 psi) to about 103.4 kPa (15 psi), about 68.9 kPa (10 psi) to about 103.4 kPa (15 psi), about 34.5 kPa (5 psi) to about 241.3 kPa (35 psi), about 55.2 kPa (8 psi) to about 241.3 kPa (35 psi), about 68.9 kPa (10 psi) to about 241.3 kPa (35 psi), about 103.4 kPa (15 psi) to about 241.3 kPa (35 psi), about 137.9 kPa (20 psi) to about 241.3 kPa (35 psi), about 172.4 kPa (25 psi) to about 241.3 kPa (35 psi), about 206.8 kPa (30 psi) to about 241.3 kPa (35 psi), about 206.8 kPa (30 psi) to about 517.1 kPa (75 psi), about 206.8 kPa (30 psi) to about 241.3 kPa (35 psi), about 206.8 kPa (30 psi) to about 275.8 kPa (40 psi), about 206.8 kPa (30 psi) to about 310.3 kPa (45 psi), about 241.3 kPa (35 psi) to about 517.1 kPa (75 psi), about 241.3 kPa (35 psi) to about 275.8 kPa (40 psi), about 241.3 kPa (35 psi) to about 310.3 kPa (45 psi), about 310.3 kPa (45 psi) to about 517.1 kPa (75 psi), about 310.3 kPa (45 psi) to about 344.7 kPa (50 psi), about 310.3 kPa (45 psi) to about 379.2 kPa (55 psi), about 379.2 kPa (55 psi) to about 482.6 kPa (70 psi), about 413.7 kPa (60 psi) to about 482.6 kPa (70 psi), about 448.2 kPa (65 psi) to about 517.1 kPa (75 psi), or any suitable value within any of the above ranges.

For example, when the valve stem 1 is used in combination with a golf cart wheel 4, the tire 5 may be pressurized to about 34.5 kPa (5 psi). When the valve stem 1 is used in combination with a lawn mower wheel 4, the tire 5 may be pressurized to about 103.4 kPa (15 psi). When the valve stem 1 is used in combination with an all-terrain vehicle (such as a 4-wheeler, 3-wheeler, quad-cycle, etc.) wheel 4, the tire 5 may be pressurized to about 55.2 kPa (8 psi). When the valve stem 1 is used in combination with an on-road vehicle (such as passenger vehicles) wheel 4, the tire 5 may be pressurized to about 206.8-241.3 kPa (30-35 psi). When the valve stem 1 is used in combination with a commercial truck wheel 4, the tire 5 may be pressurized to about 413.7-482.6 kPa (60-70 psi).

Thus, in order to insert the valve stem 1 through the wheel hole 2 into the orientation described above from the wheel side 21 of the wheel 4 (which is desirable when the tire 5 is already mounted to the wheel 4 and thereby blocks access to the tire side 22 of the wheel 4), the base 200 may contain a helical groove 208 within the surface of the base 200. This helical groove 208 allows the valve stem 1 to be installed in the wheel 4 from the wheel side 21 by inserting a bottom 224 of the base 200 into the wheel hole 2 and twisting the valve stem 1, which is described in more detail below.

The groove 208 may, in certain embodiments, be understood as having a helical arrangement (similar to the arrangement of threads on a screw), and can be described by a number of similar characteristics or measurements such as lead, pitch, groove forms, straight grooves, tapered grooves, and inner and outer radii.

As the valve stem 1 is twisted, the groove 208 provides additional clearance between the base 200 and the wheel hole 2 so that the base 200 can pass through the wheel hole 2. Simultaneously, as the valve stem 1 is rotated, the helical shape of the groove 208 provides a linear force and mechanical advantage to displace the base 200 of the valve stem 1 through the wheel hole 2 and seat the valve stem 1 in the wheel hole 2.

FIG. 1 provides a partial sectional view of a valve stem 1 as installed in a wheel hole 2 and engaged with a wheel hole flange 20. The rim 23 of the wheel hole flange 20 engages circumferentially with the neck 108 and/or axially with the shoulder 106 and/or flange landing 206 to locate the valve stem 1 in the wheel hole flange 20 to provide one or more seals 3. One or both engagements may prevent or substantially minimize leakage of gases around the perimeter of the wheel hole flange 20 when the gas is pressurized to a suitable value, depending on the type of application as described above. The engagement between the wheel hole flange 20 and portions of the valve stem 1 causes the material of the body 100, neck 108, and/or base 200 to elastically deform and form one or more seals 3 between the valve stem 1 and the wheel hole flange 20.

In certain embodiments, the valve stem 1, body 100, neck 108, and/or base 200 may comprise an elastomeric or polymeric material selected for its ability to compress or otherwise conform to another structure for the purposes of sealing, and its suitability to withstand the forces, temperatures, and chemical conditions of any particular application. Such materials include but are not limited to natural rubbers, vulcanized rubbers, and synthetic rubbers such as chloroprene, isobutylene, silicone, fluoroelastomers, neoprene, fluorosilicone, nitrilepolyacrylate rubber ("ACM"), ethylene-acrylate rubber ("AEM"), polyester urethane ("AU"), bromo isobutylene isoprene ("BIIR"), polybutadiene ("BR"), chloro isobutylene isoprene ("CIIR"), polychloroprene ("CR"), chlorosulphonated polyethylene ("CSM"), epichlorohydrin ("ECO"), ethylene propylene ("EP"), ethylene propylene diene monomer ("EPDM"), polyether urethane ("EU"), perfluorocarbon rubber ("FFKM"), fluorinated hydrocarbon ("FKM"), fluoro silicone ("FMQ"), fluorocarbon rubber ("FPM"), hydrogenated nitrile butadiene ("HNBR"), polyisoprene ("IR"), isobutylene isoprene butyl ("IIR"), acrylonitrile butadiene ("NBR"), polyurethane ("PU"), styrene butadiene ("SBR"), styrene ethylene butylene styrene copolymer ("SEBS"), polysiloxane ("SI"), vinyl methyl silicone ("VMQ"), acrylonitrile butadiene carboxy monomer ("XNBR"), styrene butadiene carboxy monomer ("XSBR"), thermoplastic polyether-ester ("YBPO"), styrene butadiene block copolymer ("YSBR"), and styrene butadiene carboxy block copolymer ("YXSBR").

The location of the seal 3 between the valve stem 1 and the wheel hole flange 20 and its ability to maintain a pressure differential between the wheel side 21 and tire side 22 of the wheel hole flange 20 depends upon the relative dimensions of the wheel hole flange 20 and portions of the valve stem 1. For example, the wheel hole flange 20 may have a wheel thickness $T_W$, which is defined as a distance between the wheel side 21 surface and the tire side 22 surface. The neck 108 may have a neck thickness $T_N$, which is defined as a distance between the edge 112 and the flange 204. To provide adequate axial sealing, in some embodiments, the wheel thickness $T_W$ may be greater than the neck thickness $T_N$. The amount of sealing available from the interaction of the wheel hole flange 20, shoulder 106 and/or flange landing 206 may also depend on the radial overlap of the shoulder 106 and/or flange landing 206 with the wheel hole flange 20. The amount of radial overlap for the shoulder 106 may be defined by the difference in the shoulder radius $R_B$ and the wheel hole radius $R_H$, as defined by:

$$R_S - R_H$$

The amount of radial overlap for the flange landing 206 may be defined by the difference in the outer radius $R_O$ measured at the flange 204 and the wheel hole radius $R_H$, as defined by:

$$R_O - R_H$$

Similarly, the valve stem 1 may seal circumferentially with respect to the wheel hole flange 20. To have adequate circumferential sealing, in some embodiments, the wheel hole radius $R_H$ may be smaller than the neck radius $R_N$. When fully seated, the engagement between the rim 23 of the wheel hole flange 20 and the neck 108 of the valve stem 1 will compress the material of the neck 108 and create a circumferential seal between the rim 23 of the wheel hole flange 20 and the neck 108. The wheel hole radius $R_H$ may be as much as 0.127 cm (0.05 inches) smaller than neck radius $R_N$. In some embodiments, the valve stem 1 may provide a seal 3 against the wheel hole flange 20 at the shoulder 106, flange landing 206, neck 108, or any combination thereof.

The groove 208, which may have a generally helical shape, provides a number of sealing advantages compared to traditional press- or pop-in valve stems. For example, the groove 208 provides a degree of mechanical advantage when inserting the valve stem 1 into the wheel hole flange 20 that allows for tighter engagement and better sealing than would normally be possible with traditional valve stem designs. When the valve stem 1 is installed, less force is required to properly seat the valve stem 1 for any given level of engagement between the valve stem 1 and the wheel hole flange 20. Reduced installation forces reduce the likelihood of installer fatigue, improper seating of the valve stem 1, and allows tighter engagements with respect to the strength of any particular installer. Furthermore, the rotating or twisting motion of the valve stem 1 during installation re-directs all or a portion of the friction and shear forces on the valve stem 1, base 200, flange 204, flange landing 206, neck 108, and/or shoulder 106 from axial loads to tangential loads. Tangential loads may be less likely to tear or otherwise damage the sealing components of the valve stem 1 during installation, providing more consistent sealing and fewer pressure leaks.

Existing valve stems are installed by passing the valve stem 1 through a wheel hole 2 from the tire side 22 to the wheel side 21. The valve stem 1 is pulled through the wheel hole 2 until it "pops" into place and seats the neck 108 within the wheel hole 2 adjacent the wheel hole flange 20. This requires that the shoulder 106 of an existing valve stem 1 be small enough to ensure that the shoulder 106 may pass through the wheel hole 2. The base 200 and the flange 204, by contrast, must be significantly larger than the wheel hole 2 to prevent the valve stem 1 from passing completely through the wheel hole 2 during installation. This design and installation method limits the amount of sealing available from the shoulder 106 of an existing valve stem 1, while also necessitating an overly large base 200 and flange 204.

The use of the groove 208 provides additional freedom in valve stem 1 design and methods of installation. The groove 208 may eliminate the need for an excessively small shoulder 106 and/or an excessively large base 200 and base 200. As such, certain embodiments of the valve stem 1 may use a shoulder 106 with a shoulder radius $R_S$ of equal or greater size to the outside radius $R_O$ of the base 200 measured at the flange 204. In some embodiments, the base 200 and/or flange 204 may be downsized to reduce material usage and/or to facilitate installation of the valve stem 1 from the wheel side 21 of the wheel hole flange 20.

Figure 2:
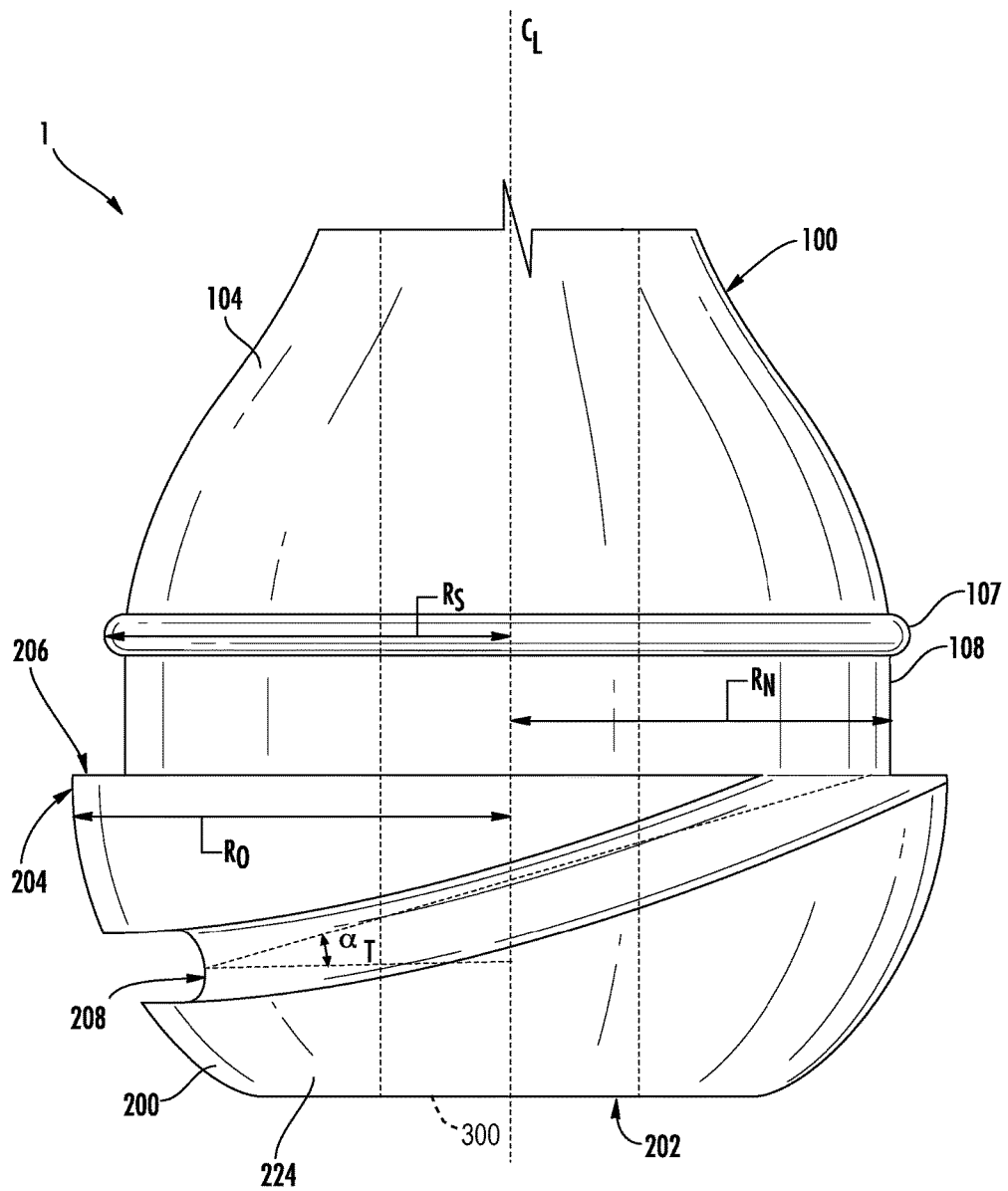
FIG. 2 is a front elevation view of the lower portion of a valve stem with a grooved base, according to certain embodiments of the present invention.

Referring to FIGS. 2 and 2A, the base 200 of the valve stem 1 may further comprise an inner radius $R_I$. The inner radius $R_I$ is defined as the distance from the centerline $C_L$ to a deepest point of the groove 208 at any point along the groove 208.

The amount of additional clearance and mechanical advantage achieved by the groove 208 is a function of a depth of the groove 208, whether the base 200 is positioned so all or only a portion of the rim 23 is positioned within the groove 208, the angle at which the groove 208 progresses around the circumference of the base 200, also known as a traversing angle $\alpha_r$, and the material properties of the base 200.

For example, in the embodiment where the entire rim 23 is positioned within the groove 208, the reduced thickness of the base 200 that is presented to pass through the wheel hole 2 at any given time is the distance between the deepest points of the groove 208 in two locations that are spaced 180 degrees apart around the circumference of the base 200 and are positioned within the portion of the groove 208 where the rim 23 is positioned at that point in time. The depth of the groove 208 may be adjusted to provide greater clearance room, but must be balanced with maintaining sufficient stability of the base 200 to act as an anchor and a seal for the valve stem 1.

The compressibility of the base 200 or any of its constituent parts (such as just within the groove 208) may be increased to provide sufficient clearance with a shallower groove 208. Alternatively, the compressibility of the base 200 or any of its constituent parts (such as just within the groove 208) may be reduced when a deeper groove 208 is used to provide additional structural support for the base 200.

With respect to mechanical advantage, a smaller traversing angle $\alpha_r$ increases the mechanical advantage by providing a smaller pitch and lead, but also increases the number of turns needed to traverse the length of the groove 208. Conversely, a larger traversing angle $\alpha_r$ decreases the mechanical advantage by providing a larger pitch and lead, but also decreases the number of turns needed to traverse the length of the groove 208.

Figure 3:
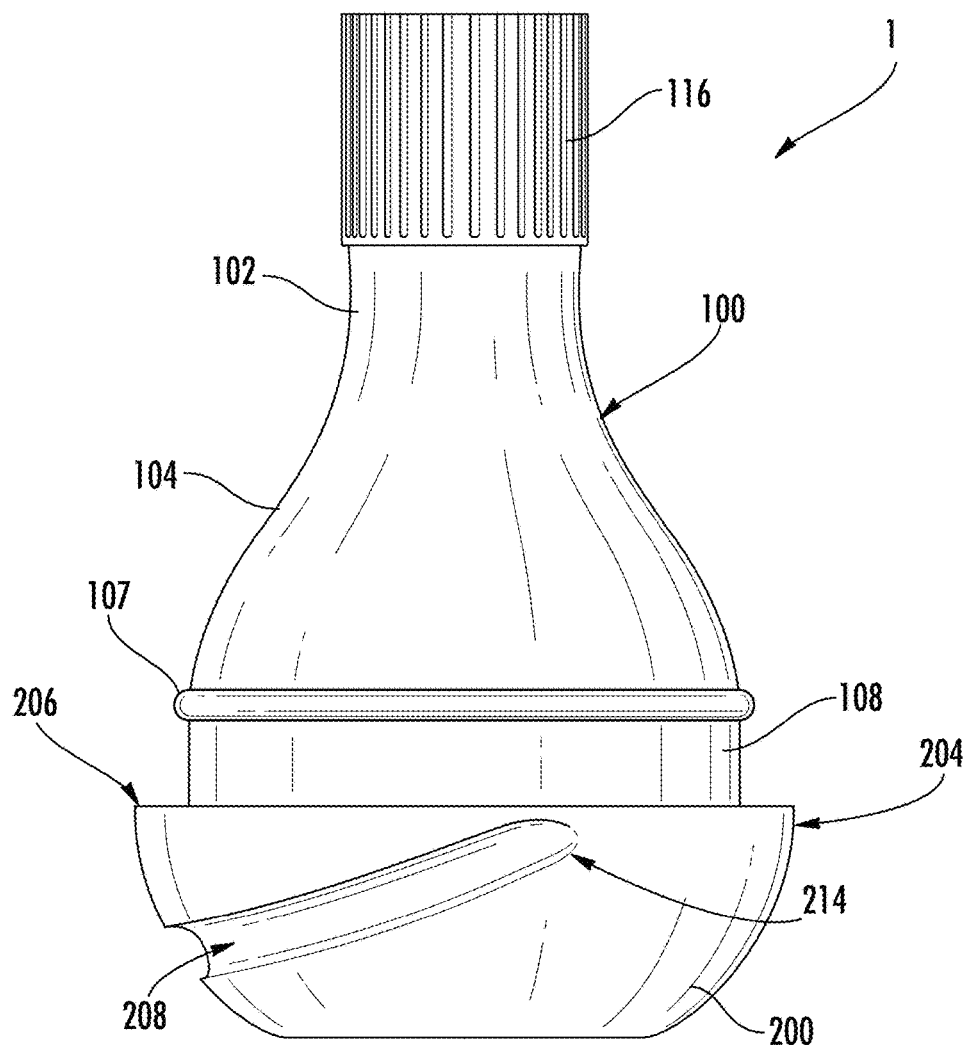
FIG. 3 is a perspective view of a valve stem with a grooved base, according to certain embodiments of the present invention.
Figure 4:
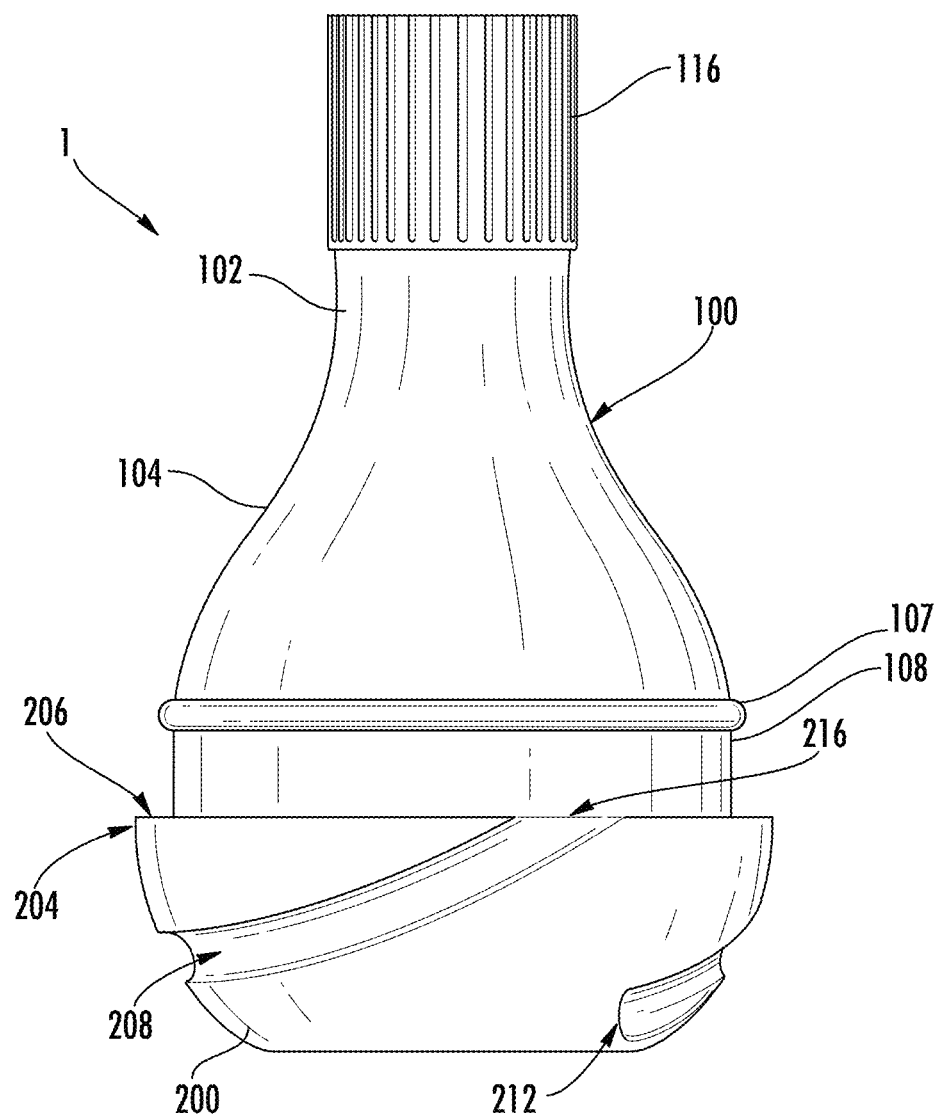
FIG. 4 is a perspective view of a valve stem with a grooved base, according to certain embodiments of the present invention.

Referring to FIGS. 3 and 4, the groove 208 on the base 200 of the valve stem 1 may have an initiation point 212 and a termination point 214 or breach 216. The initiation point 212 of the groove 208 defines the start of the groove 208 at the bottom of the base 200, and the termination point 214 defines the end of the groove 208 at or near the flange 204. In certain embodiments, as shown in FIG. 3, the termination point 214 may be below the flange 204 and/or the flange landing 206 such that the groove 208 does not reach the flange 204 and/or flange landing 206. Because the termination point 214 of the groove 208 does not reach the flange 204 and/or flange landing 206, the flange landing 206 may still provide a seal around the wheel hole 2 when the valve stem 1 is installed to retain a gas when pressurized up to a suitable value, depending on the type of application as described above During installation, as the valve stem 1 is twisted, the groove 208 rides along the rim 23 of the wheel hole 2. The material of the flange 204 will deflect or otherwise yield to allow the rim 23 of the wheel hole flange 20 to pass over the flange 204 and onto the neck 108. The groove 208 will guide the valve stem 1 through the twisting motion and provide the mechanical advantage to direct the rim 23 of the wheel hole flange 20 over the flange 204 and into position around the neck 108.

In some embodiments, as shown in FIG. 4, the groove 208 may terminate in a breach 216 of the flange 204 and/or flange landing 206. The breach 216 of the flange 204 and/or landing 206 by the groove 208 allows a clear path for the rim 23 of the wheel hole flange 20 to transition along the groove 208, through the breach 216, and into position around the neck 108. In some embodiments, the breach 216 of the flange 204 and/or flange landing 206 may be radially deep enough to extend from the outer surface of the flange 204 to the level of the neck 108, thereby leaving a complete gap in the flange landing 206. The valve stem 1 may then seal against the wheel hole flange 20 at the neck 108 and/or shoulder 106 or bead 107. In other embodiments, the breach 216 of the flange 204 and/or flange landing 206 may not be radially deep enough to reach the level of the neck 108, and a partial flange landing 206 may seal axially around the wheel hole flange 20.

Figure 5:
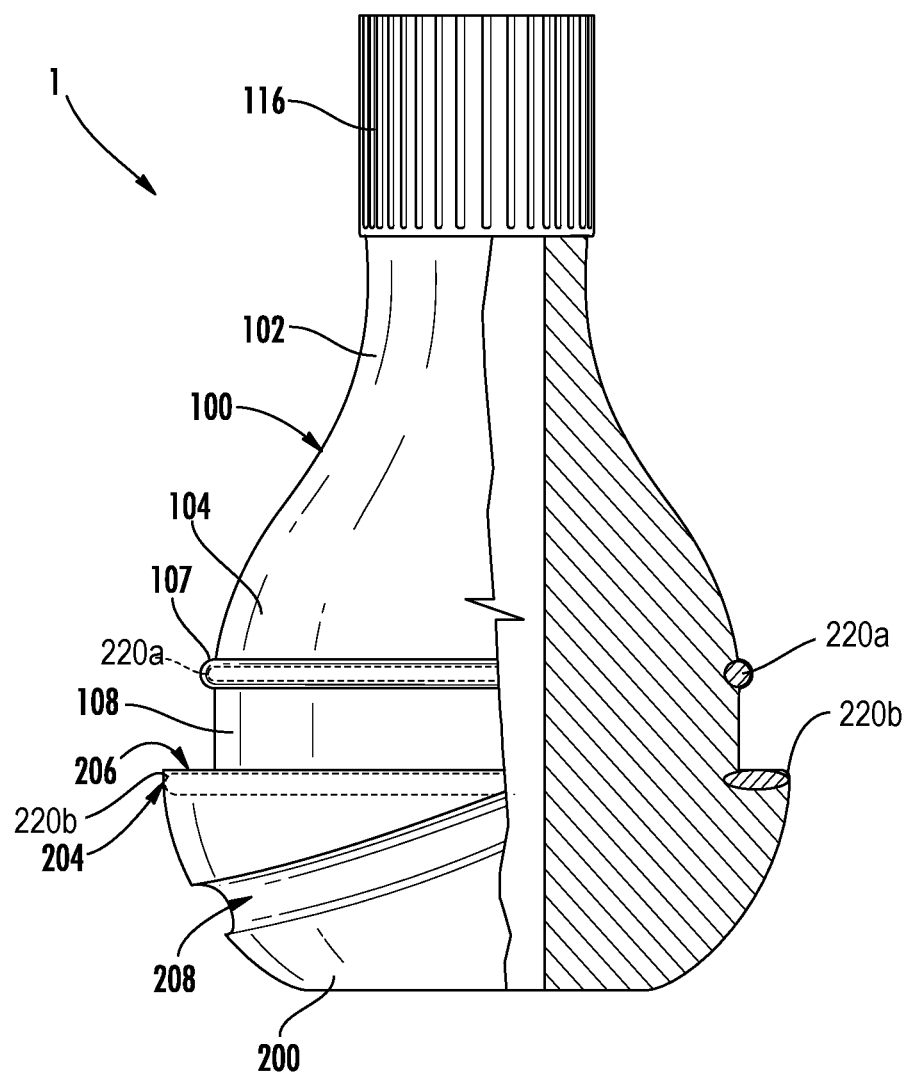
FIG. 5 is a sectional view of a valve stem with a grooved base and support structures, according to certain embodiments of the present invention.
Figure 6:
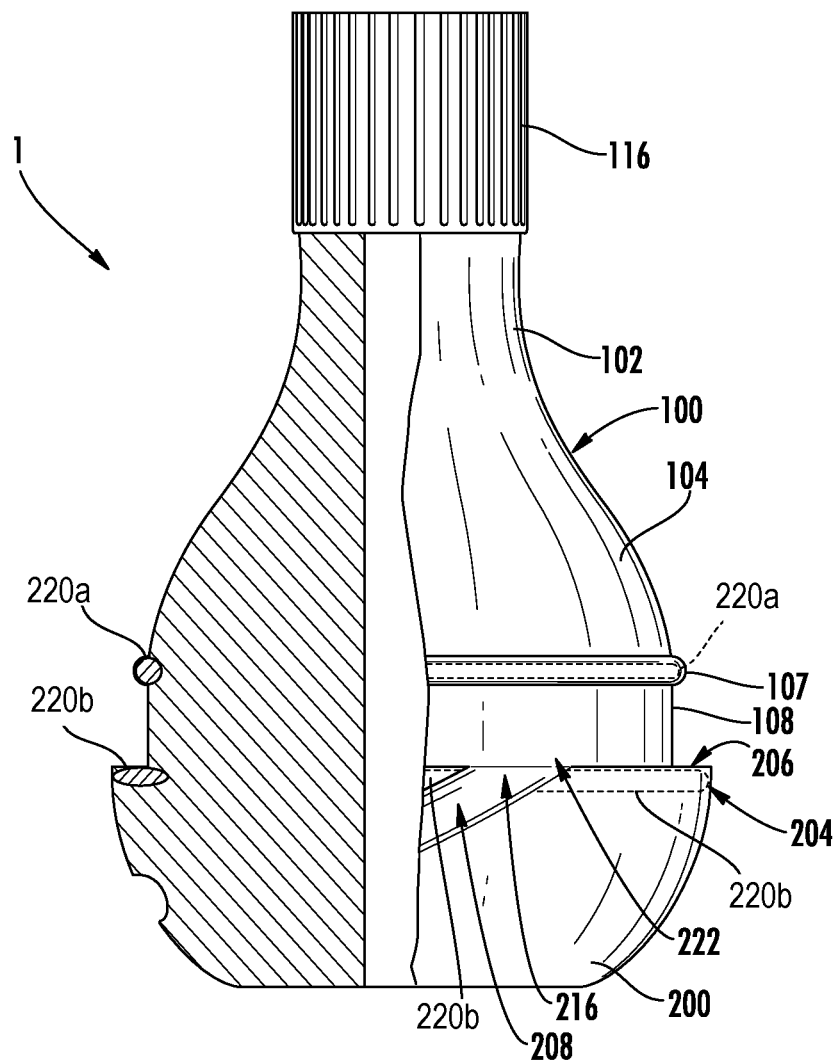
FIG. 6 is a sectional view of a valve stem with a grooved base and support structures, according to certain embodiments of the present invention.

FIGS. 5 and 6 are partial sectional views of additional embodiments of the valve stem 1. In these embodiments, the valve stem 1 may include one or more additional support structures 220a, 220b to help seal or support the valve stem 1, shoulder 106 (not shown), bead 107, neck 108, flange 204, and/or flange landing 206. For example, the valve stem 1 may include metal, plastic, or other rigid or semi-rigid support structures 220a, 220b embedded in the flexible material of the shoulder 106, bead 107, neck 108, flange 204, and/or flange landing 206 to resist deformation or provide support to maintain adequate sealing contact and pressure. In certain embodiments, the rigid or semi-rigid support structures 220a, 220b may comprise an annular support structure, wire, or other structure molded into the shoulder 106, bead 107, neck 108, flange 204, and/or flange landing 206.

Referring to FIG. 6, the support structure 220b may include a notch 222 aligned with the breach 216 of the groove 208 through the flange 204 and/or flange landing 206. The notch 222 provides clearance to allow the rim 23 of the wheel hole flange 20 to pass through the breach 216 and engage the neck 108 without interference from the support structure 220b. In some embodiments, including, but not limited to, those without a breach 216, the support structure 220b may include a notch 222 to provide extra flexibility in the flange 204 and/or flange landing 206 at or around the notch 222. The flange 204 and/or flange landing 206 may then deflect or otherwise distort at or around the notch 222 such that the rim 23 of a wheel hole flange 20 may pass over or through the flange 204 and/or flange landing 206 and seat the rim 23 of the wheel hole flange 20 about the neck 108 of the valve stem 1. In certain embodiments, the notch 222 may generally be aligned with the termination point 214 of the groove 208 so that the rim 23 of a wheel hole flange 20 will be guided by the groove 208 towards the notch 222 and facilitate the passage of the rim 23 of the wheel hole flange 20 over the flange 204 and/or flange landing 206 and into a seated position about the neck 108. The shoulder 106, bead 107, neck 108, flange 204, and/or flange landing 206 may also include additional features molded or otherwise formed into their profiles to improve sealing and pressure retention. Sealing features may include beads, ridges, or other projections of the shoulder 106, bead 107, neck 108, and/or flange landing 206 to provide additional or redundant sealing points for the valve stem 1. The shoulder 106, bead 107, neck 108, flange 204, and/or flange landing 206 may also include layers of a relatively softer, more compressible, or cellular material to better conform to the wheel hole flange 20, providing a stronger and/or more consistent seal.

Figure 7:
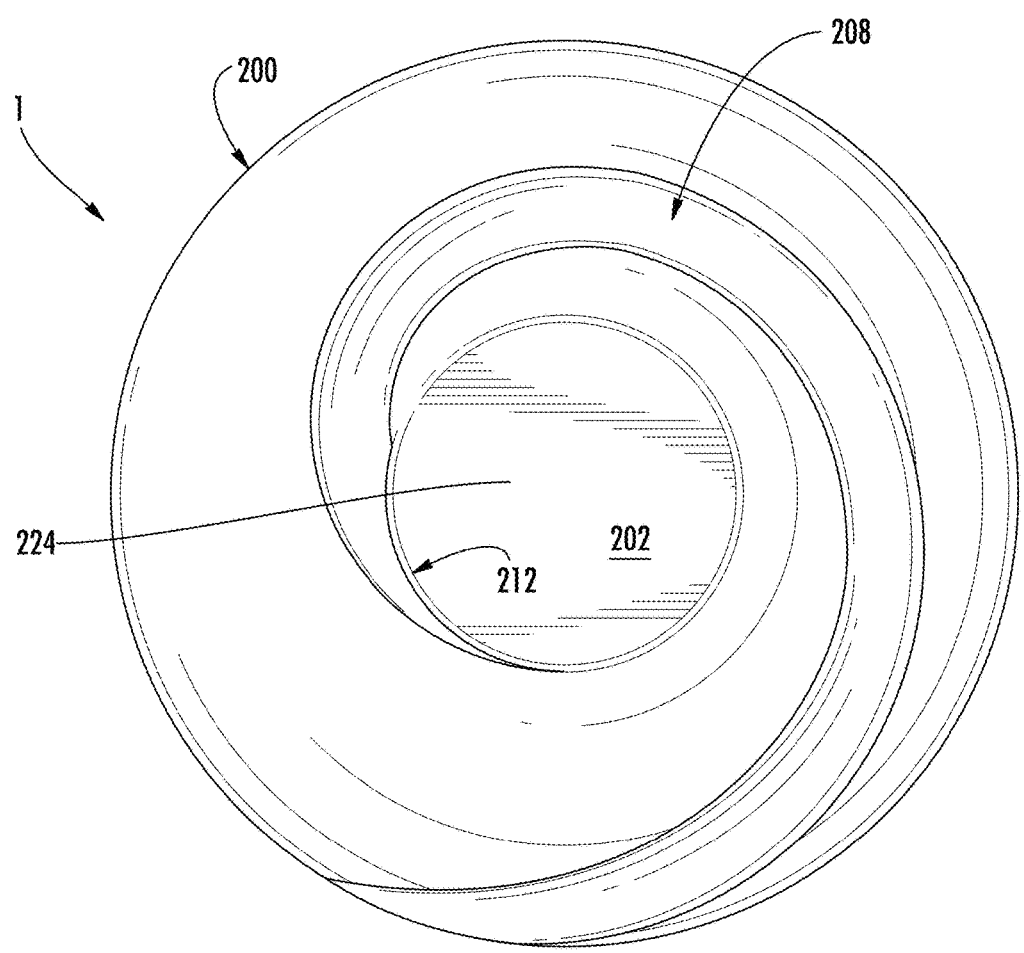
FIG. 7 is a bottom plan view of a valve stem with a grooved base, according to certain embodiments of the present invention.

FIG. 7 provides a bottom plan view of further embodiments of the valve stem 1. In these embodiments, the initiation point 212 may be located at or about the air aperture 202, which is generally located in proximity to the lower extremity of the base 200 at or about the centerline of the valve stem 1. However, the initiation point 212 may also be located near the periphery of the base 200, or anywhere between the periphery of the base 200 and the air aperture 202. In certain embodiments, the base 200 of the valve stem 1 may include two, three, or more grooves 208 arranged in a double- or multiple-spiral or helix arrangement.

Figure 8:
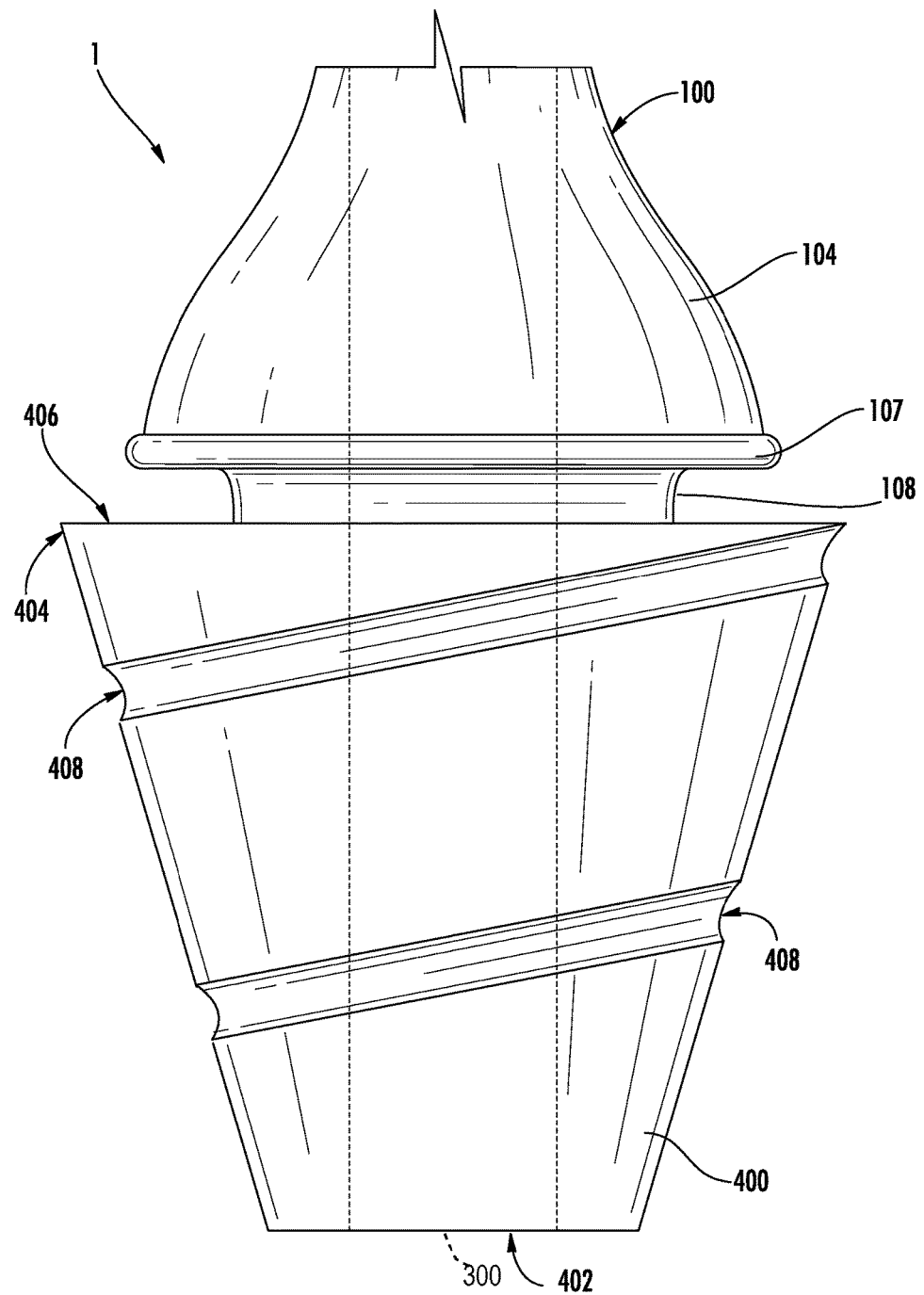
FIG. 8 is a front elevation view of the lower portion of a valve stem with a conical grooved base, according to certain embodiments of the present invention.
Figure 9:
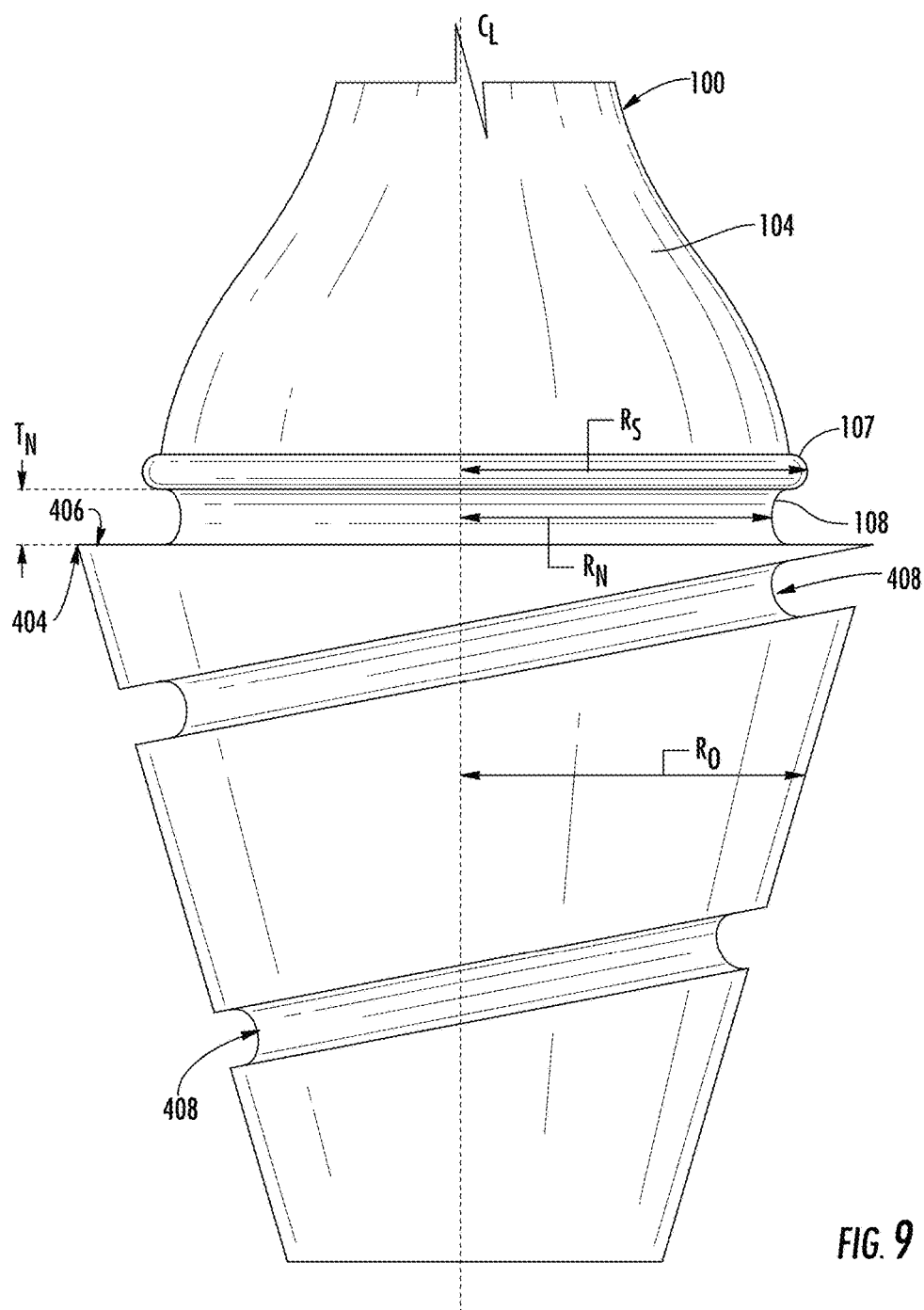
FIG. 9 is a front elevation view of the lower portion of a valve stem with a conical grooved base, according to certain embodiments of the present invention.
Figure 10:
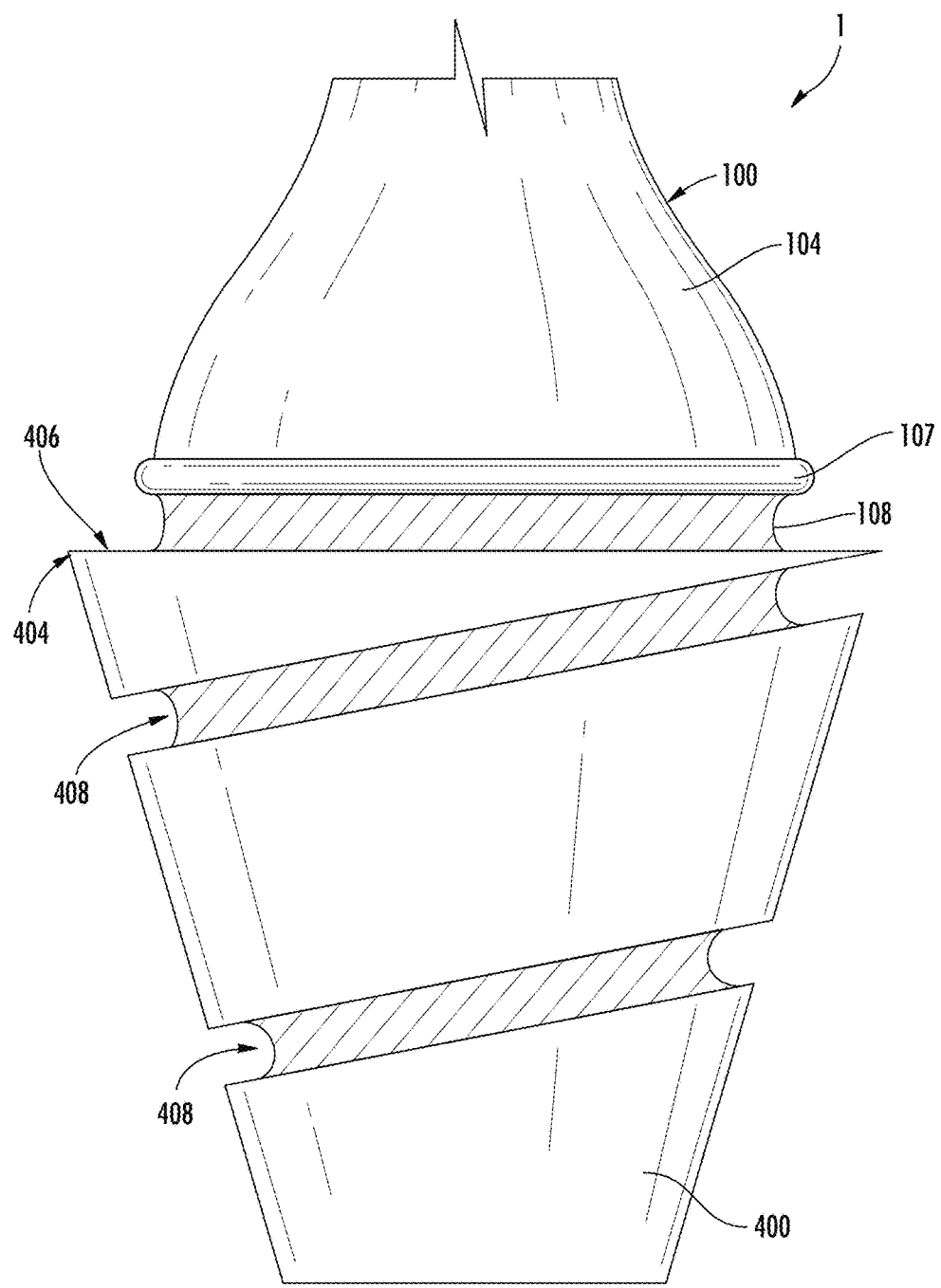
FIG. 10 is a front elevation view of the lower portion of a valve stem with a conical grooved base, according to certain embodiments of the present invention.
Figure 11A:
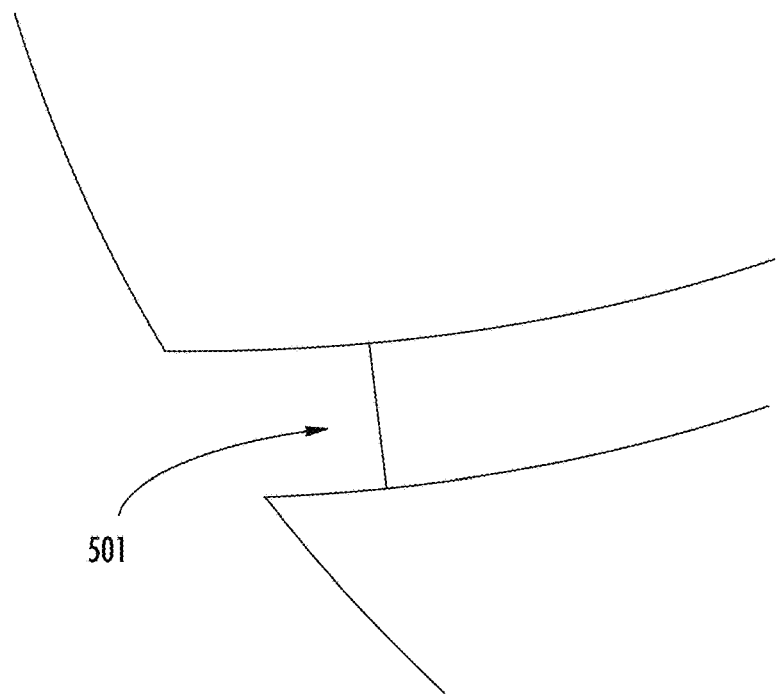
FIG. 11A is a detail view of a rectangular groove form, according to certain embodiments of the present invention.
Figure 11B:
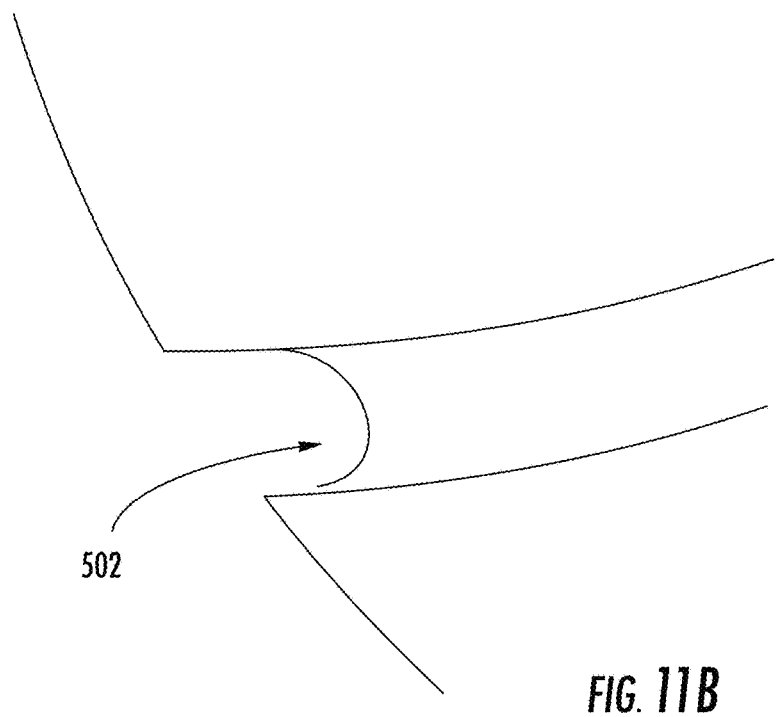
FIG. 11B is a detail view of a curved groove form, according to certain embodiments of the present invention.
Figure 11C:
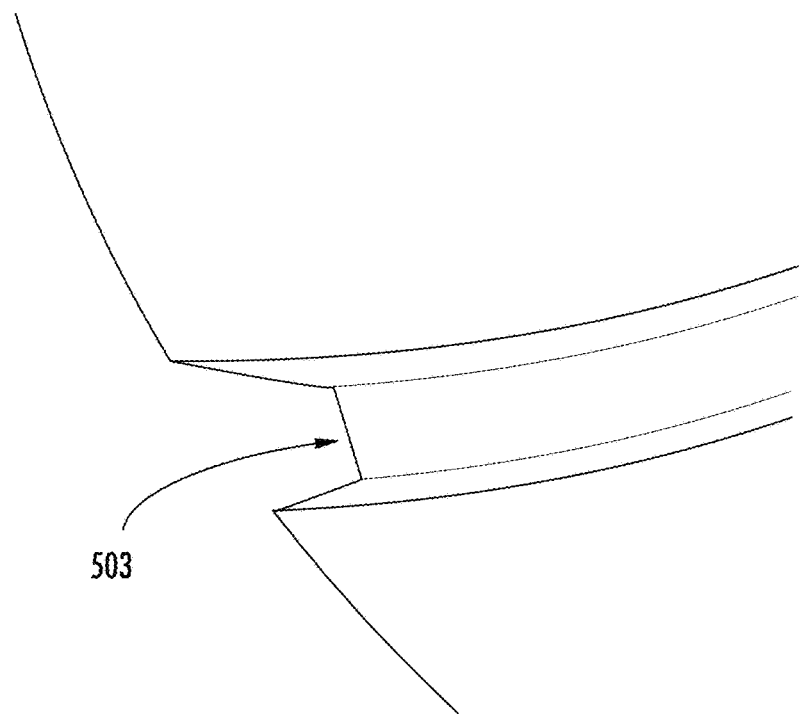
FIG. 11C is a detail view of a trapezoidal groove form, according to certain embodiments of the present invention.
Figure 11D:
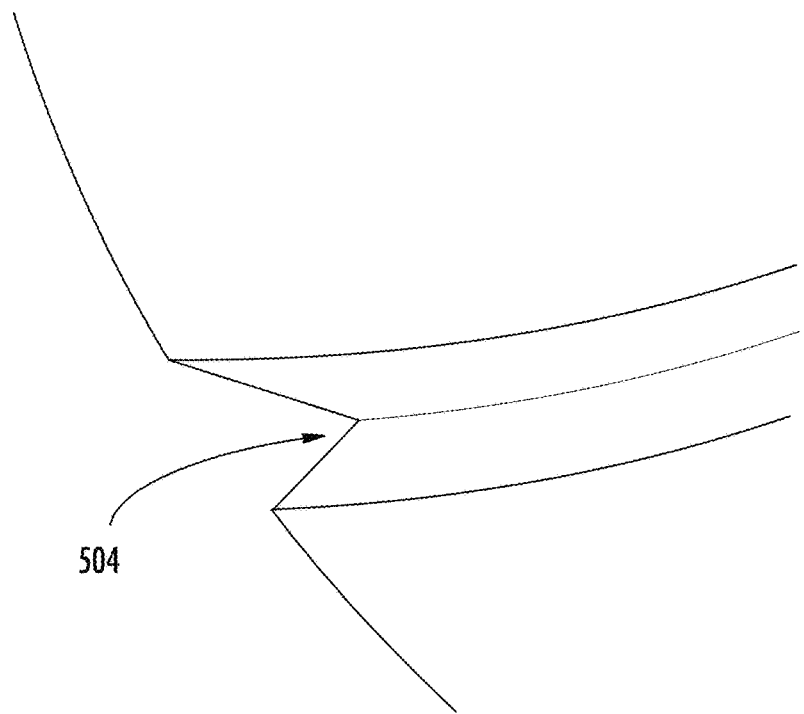
FIG. 11D is a detail view of a triangular groove form, according to certain embodiments of the present invention.

FIGS. 8-10 depict further embodiments of the valve stem 1. In these embodiments, the body 100 of the valve stem 1 may be connected through the neck 108 to a conical base 400. The conical base 400 may have a truncated vertex, forming a conical frustum shape, as shown in FIGS. 8-10. An air channel 300 may run vertically through the center of the valve stem 1 along the centerline $C_L$ of the valve stem 1 that terminates in an air aperture 402. Similar to the valve stem 1 of FIGS. 1-7, the conical base 400 may comprise a groove 408 that runs in a spiral or helical pattern from the bottom of the conical base 400 towards a flange 404 and flange landing 406.

Referring to FIG. 9, the conical base 400 of the valve stem 1 may have a varying outside radius $R_O$ that is at a minimum at the bottom of the conical base 400 and grows larger, either progressively or by discrete steps, to a larger outside radius $R_O$ at the flange 404 and/or flange landing 406. In certain embodiments, the outside radius $R_O$ may be varied to provide any regular or irregular shape to the conical base 400. Similarly, the inner radius $R_I$ of the conical base 400 may also be varied to provide varying depths or shapes to the groove 408 at any point along the conical base 400 and/or groove 408.

For example, a number of groove profiles may be possible by varying the inner radius $R_I$ and/or outer radius $R_O$. In certain embodiments, the inner radius $R_I$ may remain constant while the outer radius $R_O$ increases or decreases to provide a groove 408 that is progressively deeper or shallower with respect to the outer surface of the conical base 400. The groove 408 may also be configured to have a constant depth by varying the inner radius $R_I$ and outer radius $R_O$ together to maintain a constant depth of the groove 408 with respect to the surface of the conical base 400. In some embodiments, the groove 408 may maintain a constant depth over most of its length, but become shallower near the initiation and/or termination points of the groove 408. Such feed-in and/or feed-out slopes may be used to assist the groove 408 in gripping and releasing the wheel hole flange 20 at the beginning and/or end of the groove 408. In particular, a feed-out slope at the termination of the groove 408 may facilitate moving the rim 23 of a wheel hole flange 20 over the flange 404 and/or flange landing 406 to properly seat the rim 23 of the wheel hole flange 20 in the neck 108 of the valve stem 1.

The varying depth of the groove 408 and the varying outside radius $R_O$ of the conical base 400 may be adjusted or otherwise optimized to tailor the amount of force or resistance produced by the interaction of the conical base 400 and the wheel hole 2 and/or wheel hole flange 20. In certain embodiments, portions of the conical base 400 may not provide much or any of the sealing function that maintains the pressure difference across the valve stem 1. Rather, the conical base 400 and groove 408 may serve primarily to facilitate the installation of the valve stem 1 into the wheel hole 2, and only the shoulder 106, bead 107, neck 108, flange 204, and/or flange landing 206 provide the sealing function of the valve stem 1. In these embodiments, the outer radius $R_O$ and/or inner radius $R_I$ of the conical base 400 and groove 408 may be smaller to provide less friction and resistance to the installation of the valve stem 1.

The profile of the conical base 400 may further assist in installing the valve stem 1 via the conical base 400 from the wheel side 21 of a wheel or outside of another pressure retaining structure. The conical base 400 has a smaller outer radius $R_O$ at its bottom, which will allow the valve stem 1 to be placed into a wheel hole 2. The increasing outer radius $R_O$ of the conical base 400 will then guide the conical base 400 into the wheel hole 2, and help to orient the conical base 400 such that the groove 408 may be in position to grab the rim 23 of the wheel hole flange 20 for installation. In certain embodiments, as shown in FIGS. 9 and 10, the conical base 400 and groove 408 may be asymmetrical to further align or otherwise assist in the groove 408 engaging with the rim 23 of the wheel hole flange 20. As shown, the depth of the groove 408 may vary both vertically along the centerline $C_L$ and circumferentially around the conical base 400 to provide varying degrees of engagement between the groove 408 and the wheel hole flange 20 as the valve stem 1 is installed. In some embodiments, it may be possible to install the valve stem 1 from the wheel side 21 of a wheel simply by inserting the valve stem 1 with the conical base 400 first. In these embodiments, which may or may not include a groove 408, the shape of the conical base 400 may guide the valve stem 1 into place in the wheel hole 2 in an axial direction. The valve stem 1 may also be installed into a wheel hole 2 in the traditional method by pulling the valve stem 1 in an axial direction from the tire side of a wheel or inside of another pressure retaining structure.

Referring to FIGS. 1-10, the groove 208, 408 in the base 200 or conical base 400 of the valve stem 1 may take on any number of configurations to suit a particular application. For example, the groove 208, 408 may have a number of groove forms or groove profiles to suit a particular type of wheel hole 2 and/or wheel hole flange 20, to modify the amount of friction present during installation, and/or to prevent damage to the groove 208, 408 during installation. For example, as shown in FIGS. 11A-11D, the groove 208, 408 may have a rectangular groove form 501, a curved groove form 502, a trapezoidal groove form 503, a triangular groove form 504, any other shape groove form, or any combination of groove forms as desired or required by a particular wheel hole 2, wheel hole flange 20, and/or other features of a pressure retaining structure. Still referring to FIGS. 1-10, the groove 208, 408 may also have a varying width or depth along its length. In certain embodiments, the groove 208, 408, which may have a spiral or helical shape, may comprise less than one, one, or multiple revolutions about the base 200 or conical base 400. For example, in some embodiments the groove 208, 408 may wrap around the base 200 or conical base 0.5, 0.75, 1, 1.25, 1.5, 1.75, 2, or more times. Said differently and by way of example, the groove 208, 408, may comprise 180° of wrap about the base 200 or conical base 400, 360° of wrap about the base 200 or conical base 400, 720° of wrap about the base 200 or conical base 400, or any other amount of wrap including whole or fractional portions of the base 200 or conical base 400. In some embodiments, the groove 208, 408 may range from 60° of wrap to 720° of wrap about the base 200 or conical base 400. More particularly, the groove 208, 408 may range from 120° of wrap to 420° of wrap about the base 200 or conical base 400, or from 180° of wrap to 300° of wrap about the base 200 or conical base 400.

The amount of wrap in a particular groove 208, 408 may also influence the pitch or lead of the groove 208, 408. In some embodiments, twists of the groove 208, 408 may be relatively closely spaced to provide a smaller pitch and lead, while other embodiments may have more widely spaced twists to provide larger values of pitch and lead. The lead or pitch of the groove 208, 408 may also vary along the length of the base 200 or conical base 400. The groove 208, 408 may have relatively closely spaced twists in some regions, while others have twists spaced relatively farther apart. The amount of pitch and/or lead in a particular groove 208, 408 design may also influence the angle of the groove 208, 408 with respect to the centerline $C_L$ of a given valve stem 1, base 200, or conical base 400. The angle of the groove 208, 408 may be adjusted to alter the installation angle of a valve stem 1 and the number of turns required to install the valve stem 1. In certain embodiments, the groove 208, 408 may be designed either to facilitate or prevent over-running behavior of the valve stem 1 in response to an axial force. The groove 208, 408 may be formed or otherwise produced by molding it directly into the base 200 or conical base 400 of the valve stem 1, by cutting to remove material from the base 200 or conical base 400, or by adding material to the base 200 or conical base 400 to build up the surface around the groove 208, 408.

The valve stem 1 may be configured or specially adapted for use as a replacement valve stem in a wheel 4 or other pressure vessel that may already contain an existing valve stem 1 or other pressure control device. One exemplary method of installing the valve stem 1 involves first cutting out or otherwise removing the existing valve stem 1. The base 200 or conical base 400 of the valve stem 1 may then be lubricated with an oil-based lubricant, a liquid rubber lubricant, a soap and water solution, or another aqueous solution lubricant. In certain embodiments, the valve stem 1, base 200, and/or conical base 400 may be provided to an end user pre-impregnated with a lubricant. A pre-lubricated valve stem 1 may include a porous material that holds a lubricant, or the lubricant may be a relatively thick or heavy grease or a lubricant that sufficiently adheres to the material of the base 200 or conical base 400 deposited in the groove 208, 408. The base 200 or conical base 400 of the valve stem 1 is then placed in the wheel hole 2 of the wheel or other pressure vessel at an angle that allows the groove 208, 408 to catch on the rim 23 of the wheel hole flange 20. The valve stem 1 is then twisted or otherwise turned so that the groove 208, 408 rides along the rim 23 of the wheel hole flange 20. The twisting motion of the valve stem 1 is converted into a linear motion by the spiral or helical shape of the groove 208, 408 and pulls the base 200 or conical base 400 of the valve stem 1 past the edge of the wheel hole flange 20. As the valve stem 1 is twisted, the groove 208, 408 will ride along the rim 23 of the wheel hole flange 20 until the flange 204, 404 passes through the wheel hole 2, and the rim 23 of the wheel hole flange 20 seats on the neck 108 of the valve stem 1.

Referring to FIGS. 1-10, the valve stem 1 may include additional features to facilitate the installation of the valve stem 1 into the wheel hole 2. For example, the body 100 of the valve stem 1 may incorporate one or more flat surfaces or protrusions on the barrel 102, taper 104, shoulder 106, and/or bead 107 that are designed to mate with a complementary socket, wrench, or other twisting or turning tool. In certain embodiments, the barrel 102, taper 104, shoulder 106, and/or bead 107 may comprise six flat sides configured to mate with a hex socket, hex wrench, box wrench, crescent wrench, or other tool to facilitate twisting or turning of the valve stem 1 during installation into a wheel hole 2. The barrel 102, taper 104, shoulder 106, and/or bead 107 may include any number of flats to mate with different types of tools, such as a square drive or other multi-sided tools. Some embodiments of the valve stem 1 may also include protrusions on the barrel 102, taper 104, shoulder 106, and/or bead 107 designed to mate with a complementary tool. For example, the barrel 102, taper 104, shoulder 106, and/or bead 107 may be shaped like a hexagon, square, pentagon, star or torx fastener to mate with a complementary drive tool. The valve stem 1 may incorporate one or more of these features along the body 100. In certain embodiments, the body 100 may have different configurations of flats or protrusions for different sizes or types of drive tools on the barrel 102, taper 104, shoulder 106, and/or bead 107.

In further embodiments, the valve stem 1 may incorporate one or more flat surfaces or protrusions on the barrel 102, taper 104, shoulder 106, and/or bead 107 that are designed as finger grips or "wings" that provide locations to grip and twist the valve stem 1 without the need for a tool. In certain embodiments, the wings may be used to incorporate additional weight into the valve stem 1 to compensate for the weight removed from the base 200 to form the helical groove 208 so as to ensure that the valve stem 1 does not impact the balance of the wheel 4.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to rubber, foam, elastomers, cellular materials, polymers, or other flexible and compressible materials may be used in the general construction of the valve stem 1. Aluminum, stainless steel, fiber reinforced plastics, carbon fiber, composites, polycarbonate, other metallic materials, or other rigid polymers may be used to form reinforcements, threads, caps, or the valve core or other pressure retention devices.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A valve stem comprising:
a body comprising at least one of a shoulder or a bead, wherein the at least one shoulder or bead is configured to overlap an exterior side of a rim of a wheel hole;
an air channel;
a base comprising a flange, a flange landing, and an air aperture, wherein the flange is configured to overlap an interior side of the rim of the wheel hole; and
a neck positioned between the body and the base, wherein the neck is configured to be positioned within the wheel hole;
wherein the air channel is disposed within the body of the valve stem and is configured to enclose a valve core, and the base of the valve stem comprises at least one helical groove; and
wherein the at least one helical groove breaches the flange landing.

2. The valve stem of claim 1, wherein the at least one helical groove comprises a groove form selected from the group consisting of square, curved, trapezoidal, and triangular.

3. The valve stem of claim 1, wherein the at least one helical groove initiates at a periphery of the base.

4. The valve stem of claim 1, wherein the at least one helical groove comprises two helical grooves.

5. The valve stem of claim 1, wherein the base comprises an impregnated lubricant.

6. The valve stem of claim 1, wherein a radius of the shoulder or bead is less than a radius of the flange.

7. The valve stem of claim 6, wherein a depth at an initiation point of the at least one helical groove is greater than a depth at a termination point of the at least one helical groove.

8. The valve stem of claim 1, wherein a depth at an initiation point of the at least one helical groove is less than the depth at a termination point of the at least one helical groove.

9. The valve stem of claim 1, wherein the neck of the valve stem further comprises a surface layer comprising a sealing material selected from the group consisting of an elastomer and a foam.

10. A method for installing a replacement valve stem into a wheel hole, the replacement valve stem comprising a body comprising at least one of a shoulder or a bead; a base comprising a flange, a flange landing, and at least one helical groove that breaches the flange landing of the base; and a neck positioned between the body and the base, the method comprising:

cleaving an existing valve stem;
separating the existing valve stem from the wheel hole;
lubricating the base of the replacement valve stem;
inserting the base of the replacement valve stem into the wheel hole;
angling the replacement valve stem until the at least one helical groove engages with a rim of the wheel hole; and
rotating the replacement valve stem, wherein the at least one helical groove pulls the replacement valve stem into the wheel hole until the flange overlaps an interior side of the rim of the wheel hole, the neck is positioned within the wheel hole, and the at least one shoulder or bead overlaps an exterior side of the rim of the wheel hole.

11. The method of claim 10, wherein lubricating the base of the replacement valve stem comprises lubricating with a lubricant selected from the group consisting of an aqueous solution, a soap and water solution, an oil-based lubricant, and a liquid rubber lubricant.

* * * * *